(12) United States Patent
Wiggins (10) Patent No.: US 10,822,775 B1
(45) Date of Patent: Nov. 3, 2020

(54) PROTECTION DEVICE FOR WALL FAUCETS

(71) Applicant: Mike Wiggins, Neola, IA (US)

(72) Inventor: Mike Wiggins, Neola, IA (US)

(*) Notice: Subject to any disclaimer, the term of this patent is extended or adjusted under 35 U.S.C. 154(b) by 0 days.

(21) Appl. No.: 16/453,098

(22) Filed: Jun. 26, 2019

(51) Int. Cl.
| E02B 9/02 | (2006.01) |
| E03B 9/02 | (2006.01) |
| E03B 7/10 | (2006.01) |
| F16L 33/207 | (2006.01) |
| F16L 33/00 | (2006.01) |

(52) U.S. Cl.
CPC ............... *E03B 9/027* (2013.01); *E03B 7/10* (2013.01); *F16L 33/006* (2013.01); *F16L 33/2073* (2013.01); *Y10T 137/5497* (2015.04)

(58) Field of Classification Search
CPC ...... E03B 9/027; E03B 7/10; Y10T 137/5497; Y10T 137/5327; Y10T 137/5456
USPC ........................................................ 138/109
See application file for complete search history.

(56) References Cited

U.S. PATENT DOCUMENTS

| 3,929,150 | A | 12/1975 | Flinner et al. |
| 4,182,356 | A | 1/1980 | Woodford, Sr. |
| 4,316,481 | A | 2/1982 | Fillman |
| 4,532,954 | A | 8/1985 | Fillman |
| 5,590,679 | A | 1/1997 | Almasy et al. |
| 6,142,172 | A | 11/2000 | Shuler et al. |
| 7,798,431 | B2 * | 9/2010 | Eader ..................... A62C 35/68 239/572 |
| 9,822,915 | B2 | 11/2017 | Smahl et al. |
| 9,869,413 | B2 | 1/2018 | Laakso et al. |
| 2010/0229961 | A1 * | 9/2010 | Ball et al. ................. E03B 7/10 137/299 |
| 2014/0251441 | A1 * | 9/2014 | Smith et al. .............. E03B 9/14 137/1 |
| 2017/0045236 | A1 * | 2/2017 | Alsberg .................... F24D 3/14 |
| 2019/0323613 | A1 * | 10/2019 | Ismert ................. F16L 37/0915 |

* cited by examiner

Primary Examiner — Kevin L Lee
(74) Attorney, Agent, or Firm — Dennis L. Thomte; Thomte Patent Law Office LLC (57) ABSTRACT

A wall faucet is disclosed which has an elongated section of a PEX tube inserted into the water inlet pipe of the wall faucet. The PEX tube is capable of expanding should there be water in the water inlet pipe during freezing temperatures thereby preventing the water inlet pipe from bursting.

3 Claims, 12 Drawing Sheets

PROTECTION DEVICE FOR WALL FAUCETS

BACKGROUND OF THE INVENTION

Field of the Invention

This invention relates to a protection device for wall faucets, sill cocks, hydrants, etc., hereinafter "wall faucets". More particularly, the invention relates to an elongated tube comprised of cross-linked polyethylene (PEX) material which is imposed in the elongated hollow water inlet tube of a freezeless or frost-proof wall faucet. More particularly, this invention relates to a protection device for wall faucets wherein the protection device will expand as the water in the water inlet tube freezes to relieve the pressure on the inlet tube to prevent the inlet tube from bursting.

Description of the Related Art

Many freezeless and frost-free wall faucets have been previously provided to prevent the water inlet tube thereof from freezing and bursting. However, in some situations, such as when a hose is connected to the discharge end of the faucet during freezing temperatures, the inlet tube will freeze and burst. Further, in some instances, the intake valve of the faucet will leak so that water accumulates in the inlet tube and may freeze with the freezing thereof causing the inlet tube to burst causing severe water damage to the home or building in which the wall faucet is mounted.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A protection device is provided for wall faucets, sill cocks, hydrants, etc. The wall faucet includes a water outlet assembly having an inner end and an outer end. A metal outer pipe section, having an outer end and an inner end, has the outer end thereof secured to the water outlet assembly so as to be in fluid communication therewith. The metal outer pipe section extends inwardly from the inner end of the water outlet assembly. The wall faucet also includes a first hollow metal coupler having an outer end and an inner end. The outer end of the first hollow metal coupler embraces the inner end of the metal outer pipe section and is secured thereto. The wall faucet also includes an elongated tube, having inner and outer ends, with the elongated tube being comprised of a PEX material having memory properties. A first compression ring comprised of a PEX material having memory properties embraces the outer end of the elongated tube. The outer end of the elongated tube and the first compression ring thereon are clamped onto the outer end of the first hollow metal coupler. The wall faucet also includes a second compression ring comprised of a PEX material having memory properties with the second compression ring embracing the inner end of the elongated tube. A second hollow metal coupler, having an outer end and an inner end, is provided. A metal inner pipe section is provided having an outer end and an inner end with the outer end of the metal inner pipe section being received in the outer end of the second hollow metal coupler and being secured thereto. The outer end of the elongated tube and the second compression ring thereon receives the inner end of the second hollow metal coupler therein and is clamped thereon. An elongated valve stem extends through the water outlet nozzle assembly through the outer pipe section, through the first hollow metal coupler, through the elongated tube, through the second hollow metal coupler, and into the inner pipe section.

If the wall faucet is subjected to freezing temperatures and there happens to be water in the inlet tube, the elongated tube will expand thereby preventing the inlet tube from bursting under pressure of freezing.

It is therefore a principal object of the invention to provide an improved wall faucet of the freezeless type.

A further object of the invention is to provide a wall faucet which includes a section of expandable PEX material imposed therein which prevents the water inlet pipe of the wall faucet from bursting.

A further object of the invention is to provide a unique method of modifying a wall faucet to prevent the water inlet pipe thereof from bursting when exposed to freezing temperatures.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
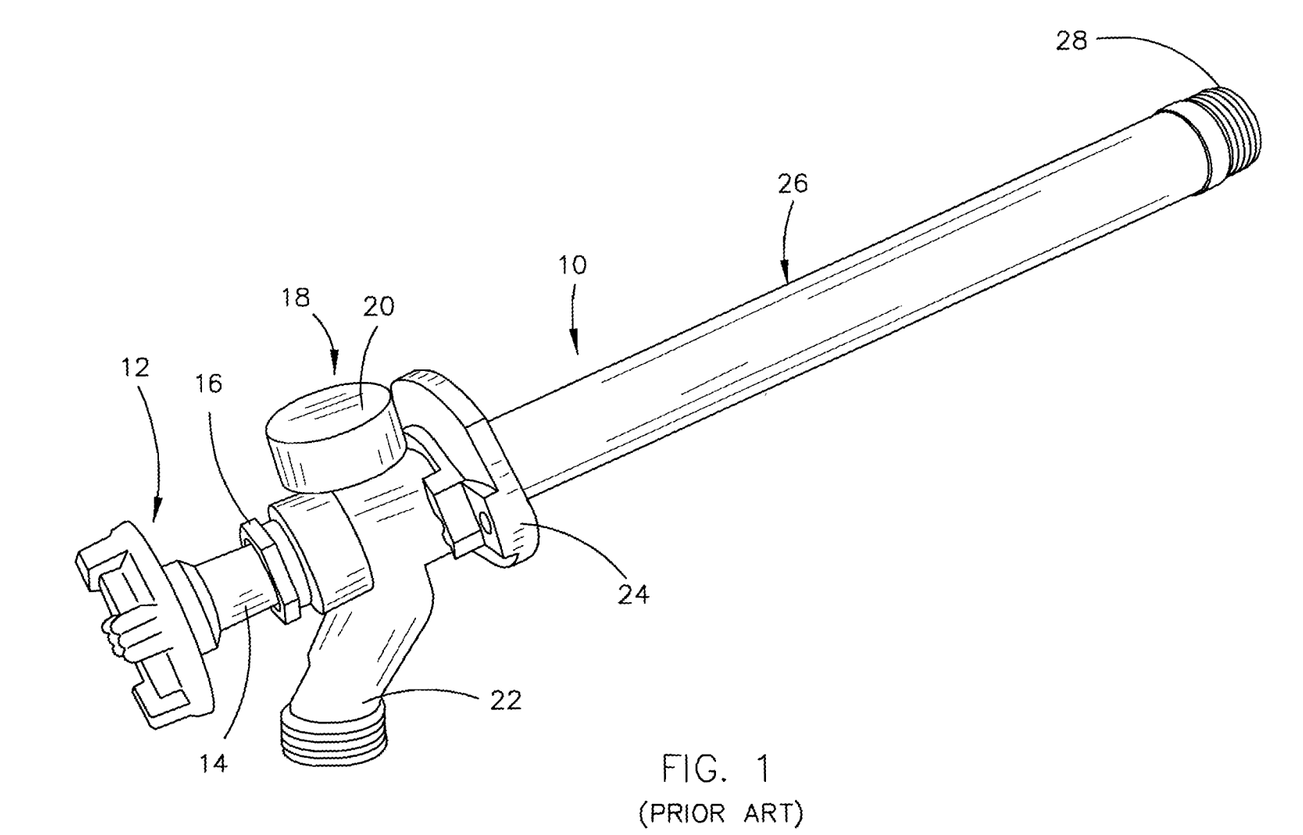
FIG. 1 is a perspective view of a prior art wall faucet of the frost-free or free-proof type.
Figure 2:
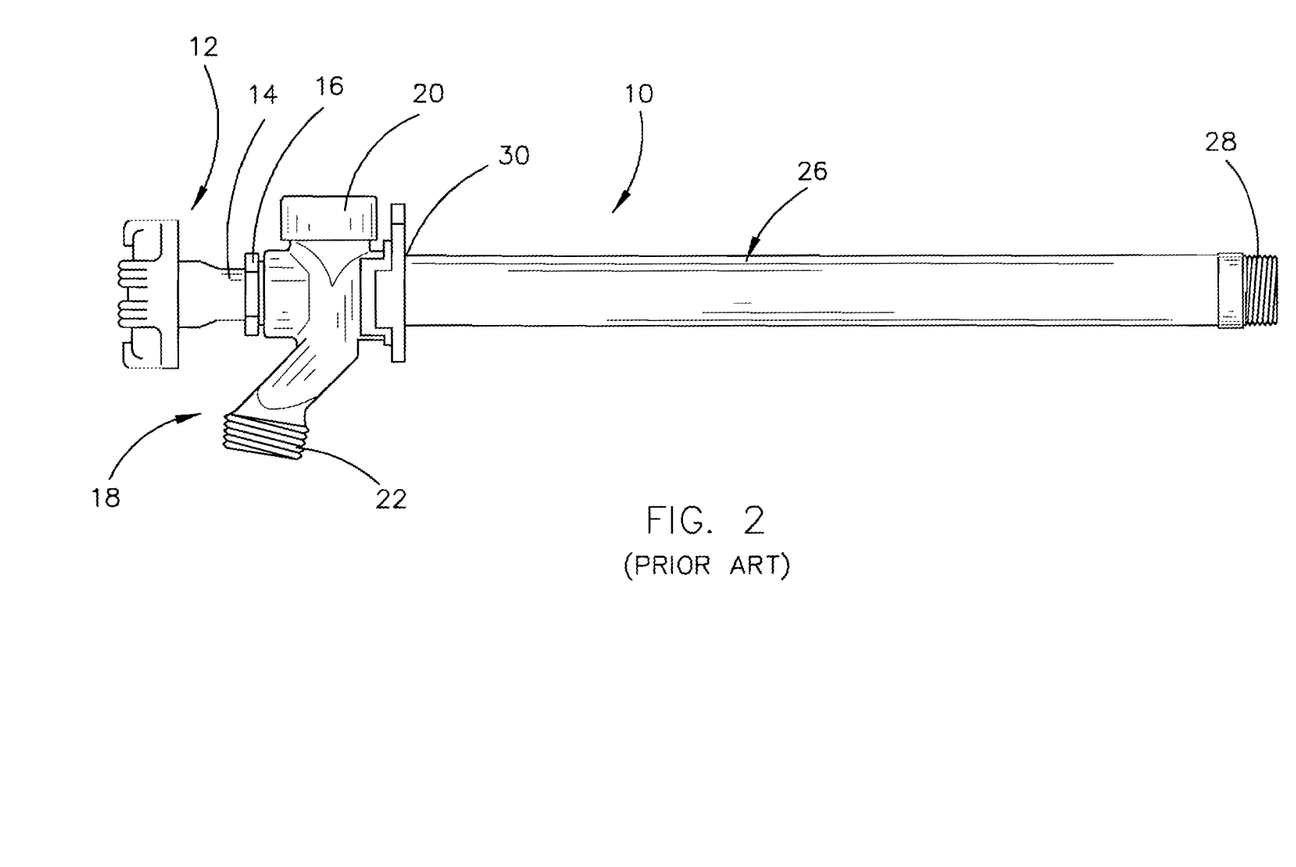
FIG. 2 is a side view of the wall faucet of FIG. 1.
Figure 3:
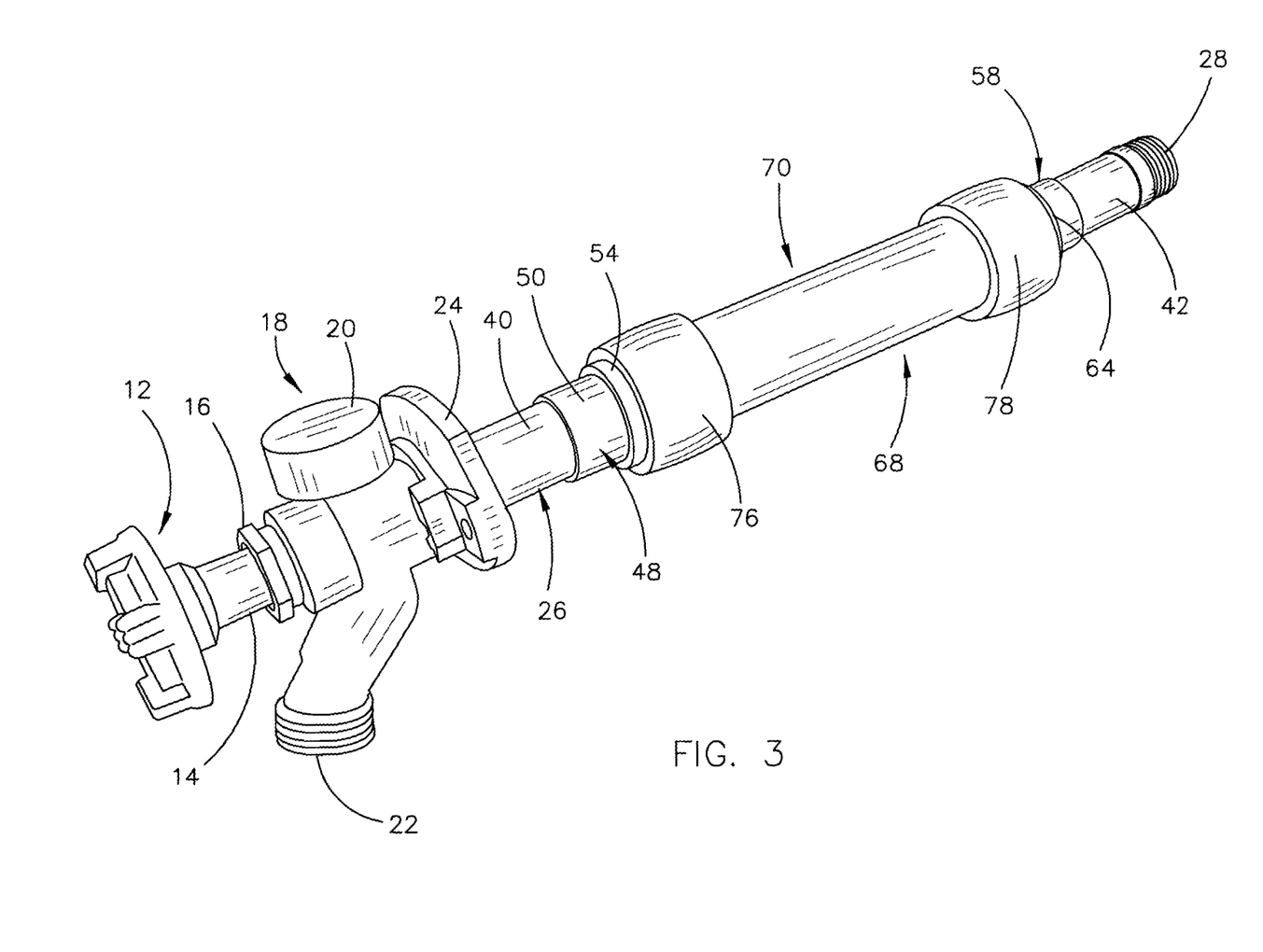
FIG. 3 is a perspective view of a wall faucet having the protection device incorporated therein.
Figure 4:
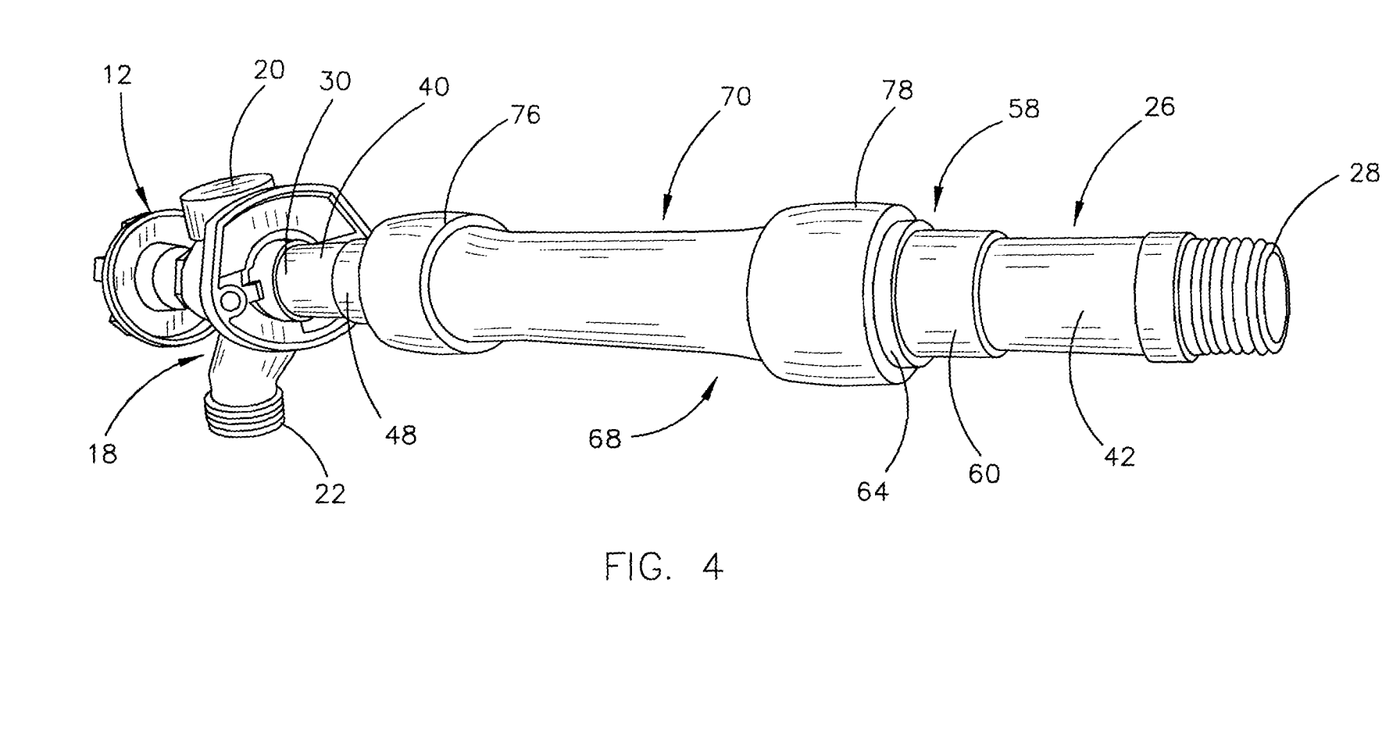
FIG. 4 is a perspective view of the wall faucet of FIG. 3.
Figure 5:
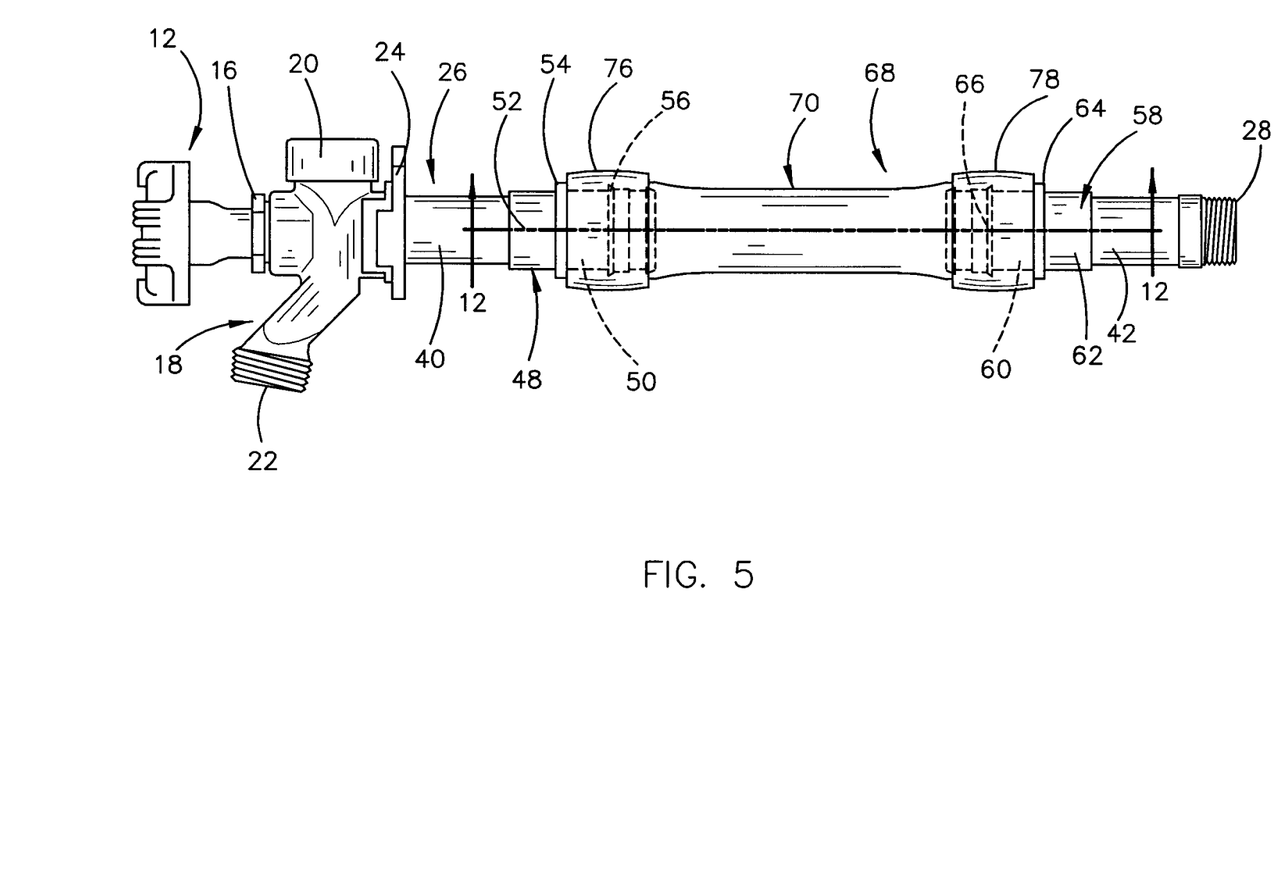
FIG. 5 is a side elevational view of the faucet of FIG. 3.

The numeral 10 refers to a prior art freezeless wall faucet such as manufactured by Woodford Manufacturing Company located at 2121 Waynoka Road, Colorado Springs, Colorado 80915 and identified as a Model 17 wall faucet. Wall faucet 10 includes a handle 12 having a shaft portion 14 which rotatably extends through a packing nut 16 which is threadably secured to a water outlet assembly 18. Water outlet assembly 18 includes a vacuum breaker 20 and a water discharge spout 22. Water outlet assembly 18 includes an adjustable flange 24 which is normally secured to the exterior surface of a wall (not shown).

The numeral 26 refers to an elongated hollow water inlet tube which is usually copper. Tube 26 includes an inner end 28 which is connected to a water supply in conventional fashion. The outer end 30 of inlet tube 26 is connected to the water outlet assembly 18 in conventional fashion. A conventional valve stem assembly 32 is operatively connected to the handle 12 in conventional fashion.

Figure 6:
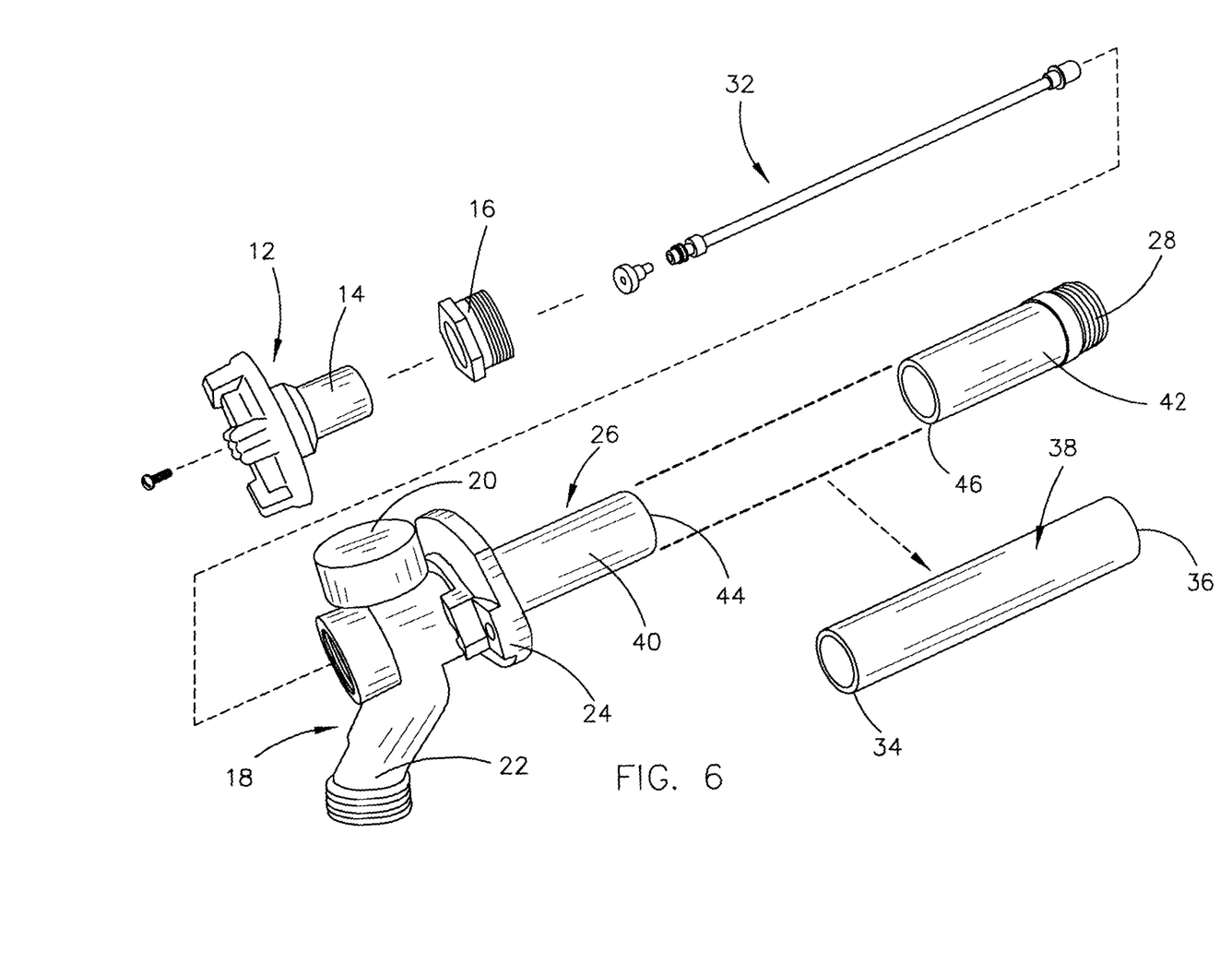
FIG. 6 is an exploded perspective view of the prior art wall faucet which illustrates a portion of the water inlet tube being removed therefrom.

The first step in the assembly of the instant invention, which will be described in detail hereinafter, is to remove the valve stem assembly 32 from the water inlet tube 26 in conventional fashion. The next step is to cut the water inlet tube 26 in two places which are designated with the reference numerals 34 and 36 so that a length of the water inlet tube 26 may be removed from the water inlet tube 26 with the removed length or segment of water inlet tube 26 being designated by the reference numeral 38. The removal of segment 38 from water inlet tube 26 creates an outer tube section 40 and an inner tube section 42. As seen in FIG. 6, outer tube section 40 has an inner end 44 and inner tube section 42 has an outer end 46.

Figure 7:
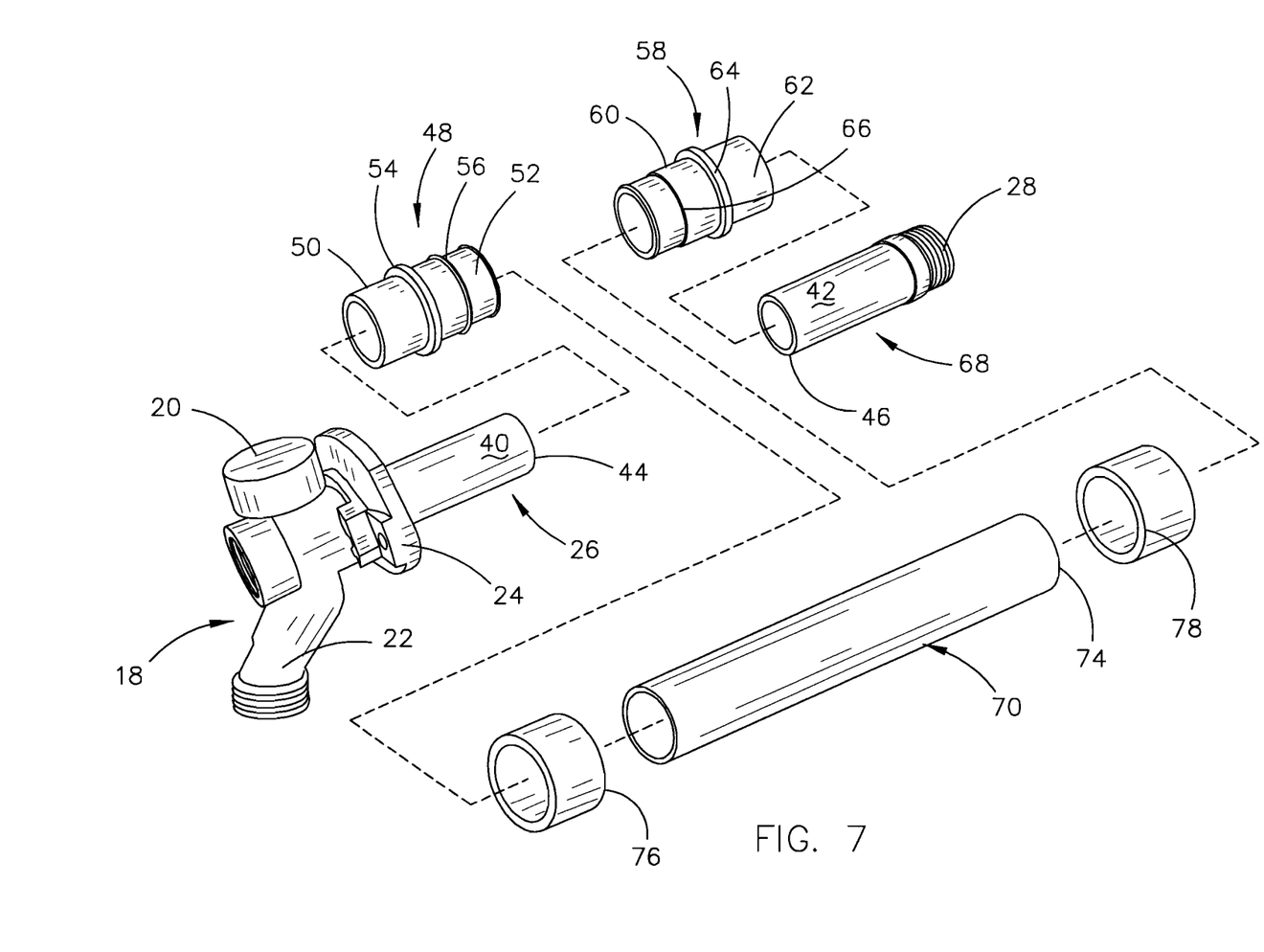
FIG. 7 is an exploded perspective view of the protection device and a portion of the wall faucet.

The numeral 48 refers to a hollow metal coupler having a cylindrical outer end portion 50 and a cylindrical inner end portion 52. Coupler 48 has a protruding annular ring 54 positioned between outer end portion 50 and inner end portion 52. The inner end portion 52 has a protruding annular rib 56 extending outwardly therefrom. The outer end portion 50 of coupler 48 is configured to be received in inner end 44 of outer tube section 40. The outer end portion 50 of coupler 48 is soldered to outer tube section 40 in conventional fashion.

Figure 10:
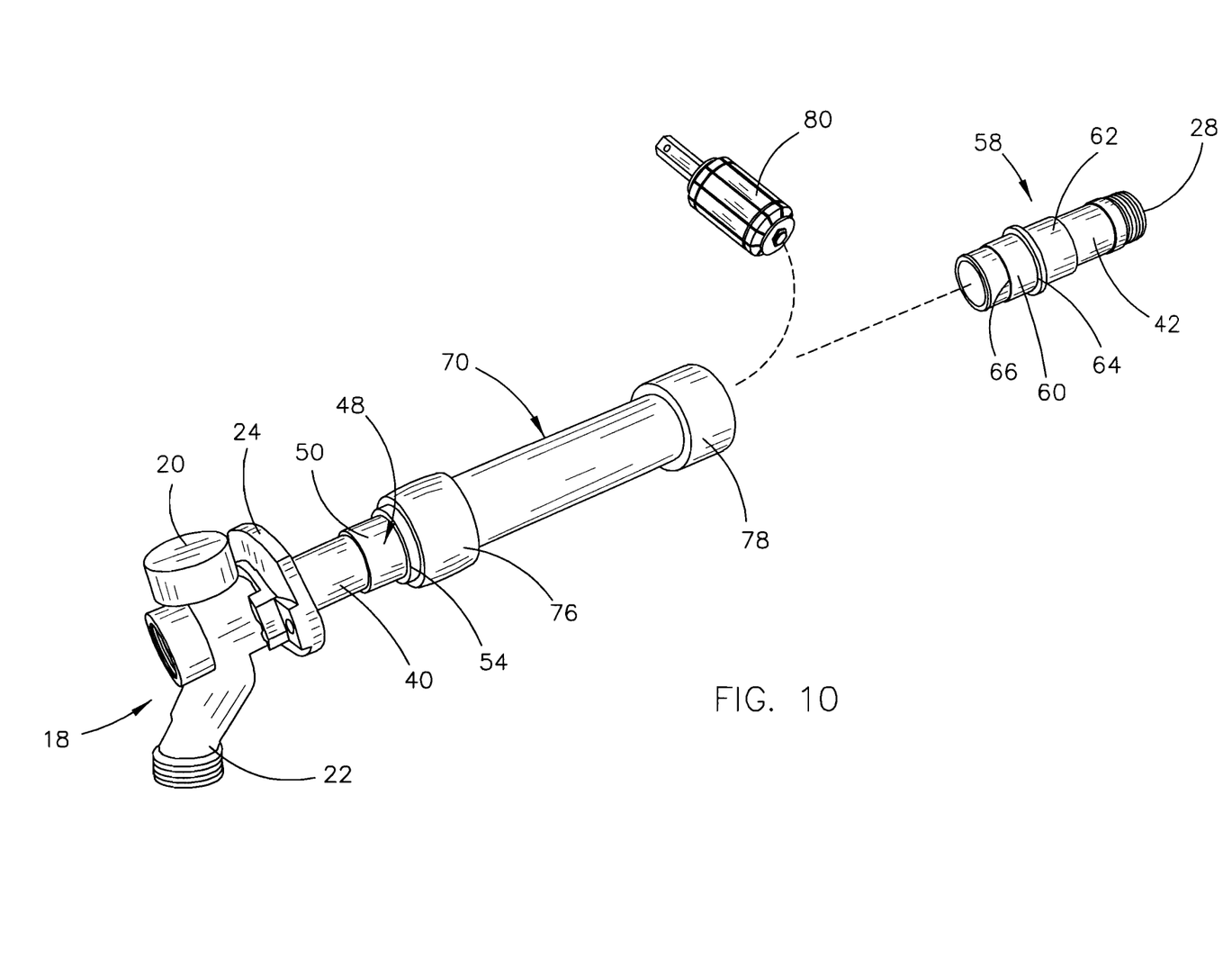
FIG. 10 is an exploded perspective view which illustrates the inlet side of the protection device.

The numeral 58 refers to a second hollow metal coupler having a cylindrical inner end portion 60 and a cylindrical outer end portion 62. Coupler 58 has a protruding annular ring 64 positioned between inner end portion 60 and outer end portion 62. The outer end portion 62 has a protruding annular rib 66 extending outwardly therefrom. The outer end portion 62 of coupler 58 is configured to receive the outer end 46 of inner tube section 42. The outer end portion 62 of coupler 58 is soldered to inner tube section 42 in conventional fashion.

The protection device of this invention is referred to by the reference numeral 68 as will be described hereinafter. The couplers 48 and 58 form a part of the invention. Protective device 68 includes an elongated hollow tube 70 having ends 72 and 74. Tube 70 is comprised of a cross-linked polyethylene material (PEX). The PEX material of the tube 70 has memory properties. In other words, if one end of the tube 70 is expanded by a tube expander, the tube will gradually return or move to its original position as will be further discussed hereinafter.

The device 68 also includes clamps or compression rings 76 and 78 which are also comprised of PEX and which have memory properties. The rings 76 and 78 have inside diameters sufficient to slip the rings 76 and 78 onto the ends 72 and 74 of tube 70. Preferably, the interior of the rings 76 and 78 have annular stops formed at the outer ends thereof to limit the inward movement of the rings 76 and 78 with respect to the tube 70.

Figure 8:
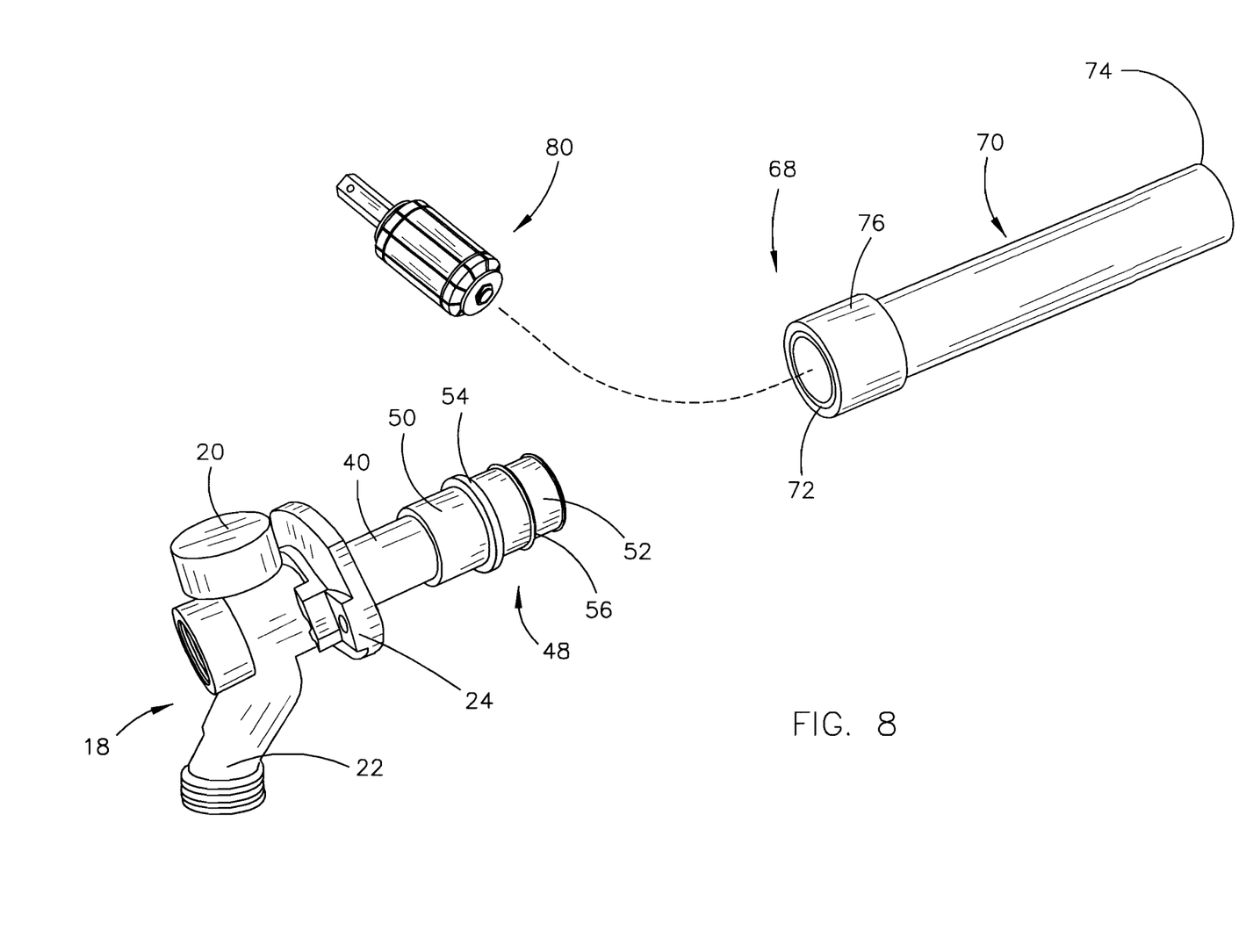
FIG. 8 is a perspective view illustrating the manner in which the discharge end of the protection device is being enlarged or expanded.
Figure 9:
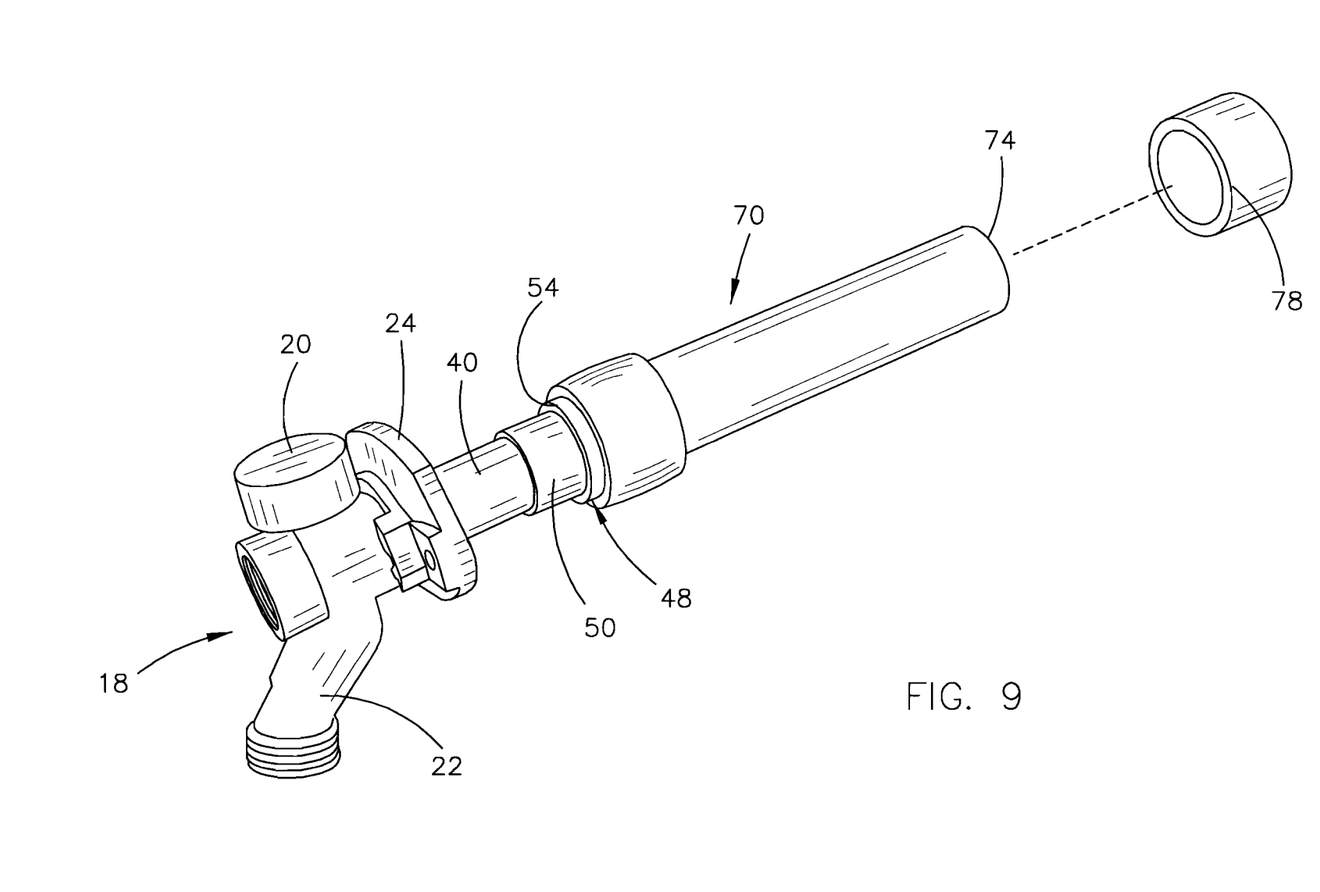
FIG. 9 is a perspective view illustrating the outer end of the protection device being secured and which illustrates a further step in the assembly of the protection device.

If a prior art wall faucet is to be modified so as to incorporate the instant protection device 68, the valve stem assembly 32 will be removed from the tube 26. After the water inlet tube has been cut in two places to be able to remove the segment 38 from water inlet tube 26, the following steps are accomplished. The coupler 48 is soldered to the outer end of outer tube section 40. The compression ring 76 is mounted on the inner end of tube 70. A conventional tube expander 80 is then inserted into the inner end 72 of tube 70 and actuated so as to cause the inner end 72 of tube 70 and compression ring 76 thereon to be expanded. When the inner end 72 of tube 70 and the compression ring 76 have been expanded, the tube expander 80 is withdrawn from the inner end 72 of tube 70. The outer end portion 52 of coupler 48 is then quickly inserted into the open inner end 72 of tube 70 until ring 54 of coupler 48 engages the inner end 72 of tube 70. The memory properties of tube 70 and compression ring 76 will then cause the inner end of tube 70 to close and clamp onto the inner end portion 52 of coupler 48 to securely connect coupler 48 and tube portion 40 to tube 70.

Figure 11:
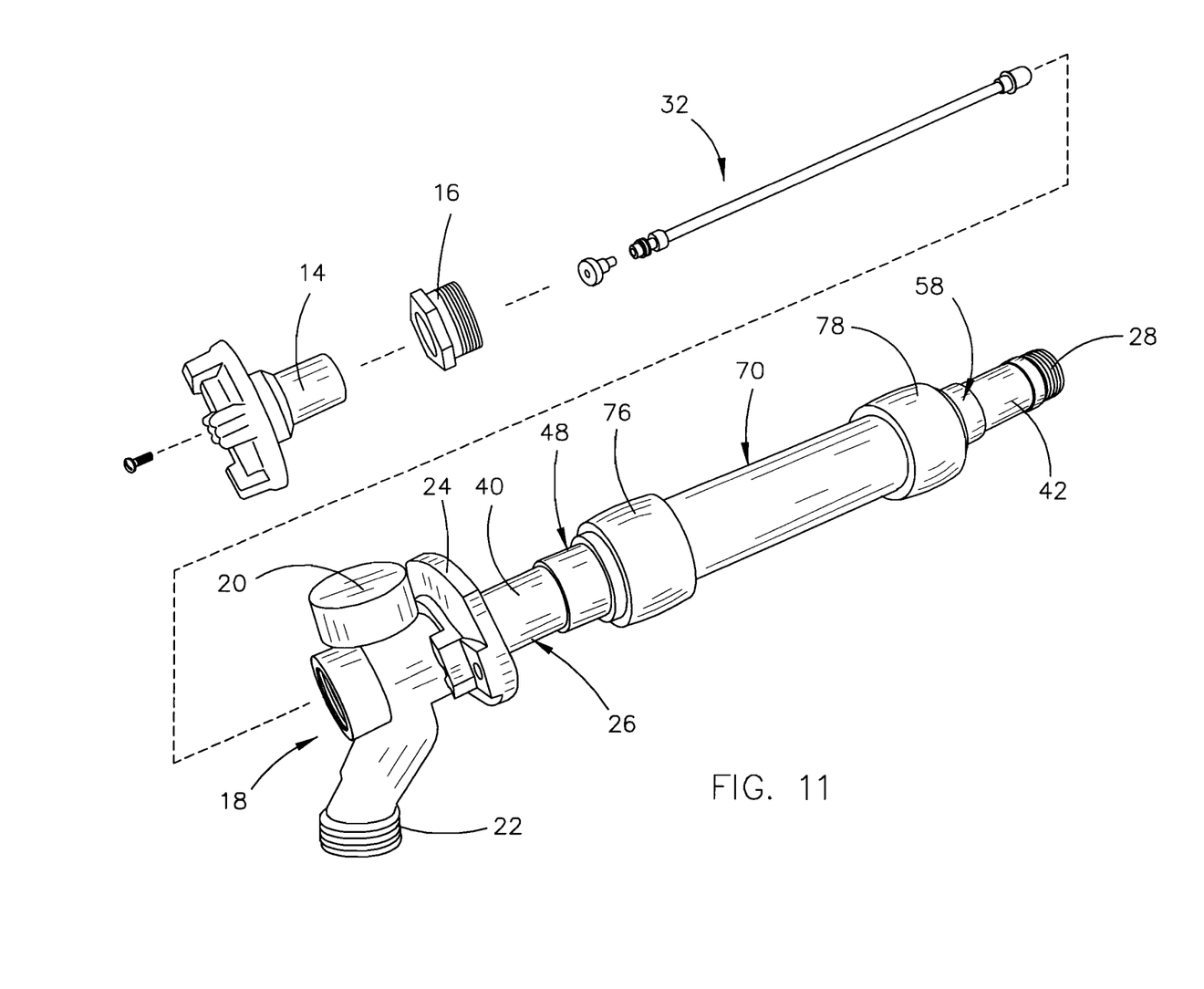
FIG. 11 is an exploded perspective view of the protection device of this invention installed in the wall faucet.
Figure 12:
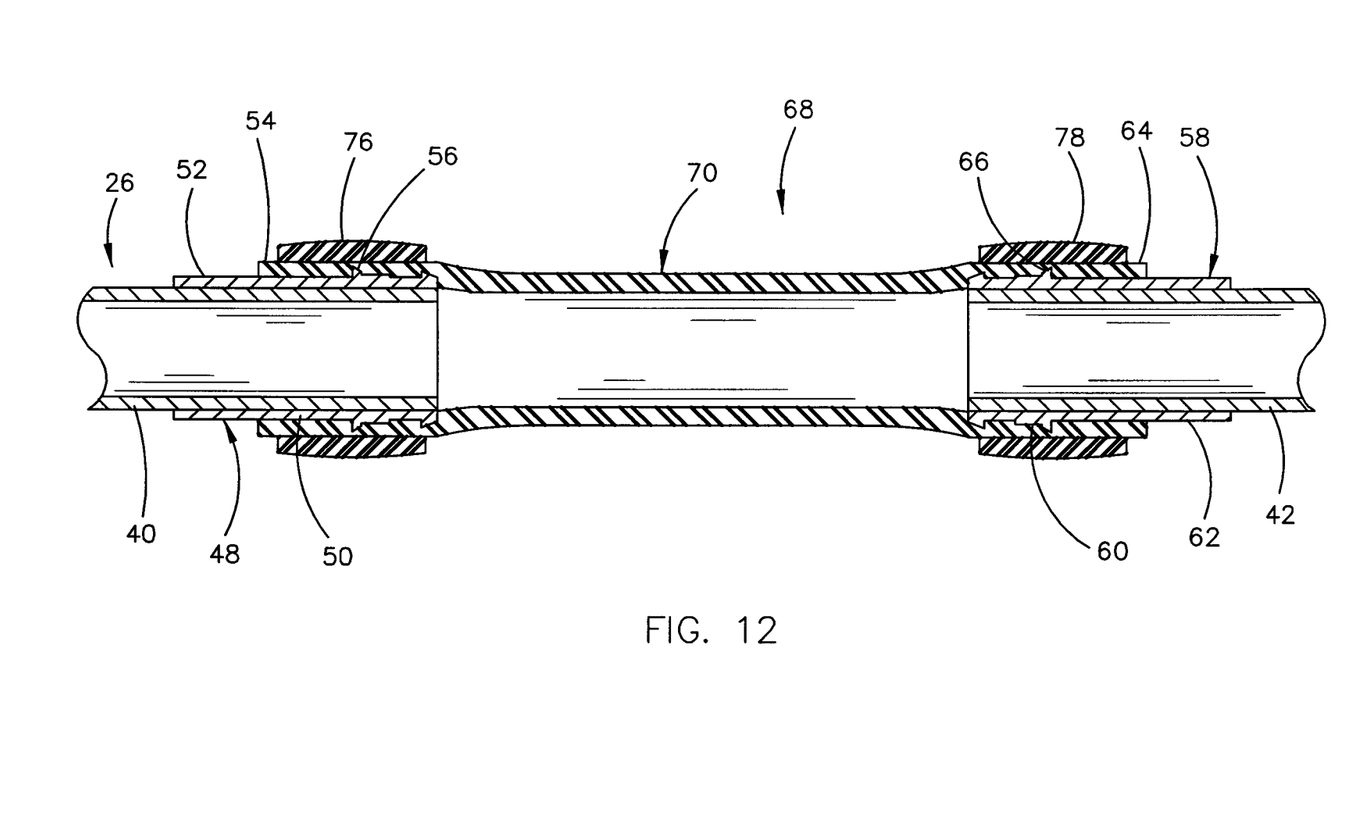
FIG. 12 is a sectional view as seen on Lines 12-12 of FIG. 5.

If not already done so, the inner end portion 62 of coupler 58 will receive the outer end 46 of tube section 42. Coupler 58 will then be soldered to tube section 42 in conventional fashion. The compression ring 78 will then be slipped onto the inner end 74 of tube 70. The tube expander 80 will then be inserted into the open inner end 74 of tube 70 and activated to expand the inner end 74 of tube 70 and the compression ring 78. When the inner end 74 of tube 70 and the compression ring 78 have been sufficiently expanded, the tube expander 80 is withdrawn from tube 70. The inner end 60 of coupler 58 is then quickly inserted into the expanded inner end of tube 70 until ring 64 engages the inner end 72 of tube 70. The memory properties of tube 70 and compression ring 78 will then cause the inner end 74 and the compression ring 78 to close and clamp upon the inner end portion 62 of coupler 58 to securely connect coupler 58 and tube portion 42 to tube 70.

In summary, the prior art freezeless wall faucet 10 may be modified as discussed above. In the alternative, the wall faucet could come from the factory with the components of the protection device 68 already in place. In any event, the PEX hollow tube 70 will expand if water is present in the inlet tube 26 and the wall faucet 10 is subjected to freezing temperatures with the expansion of the PEX tube 70 relieving pressure on the water inlet tube 26 thereby preventing the tube 26 from bursting.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A wall hydrant, comprising:

a water outlet assembly having an inner end and an outer end;

a metal outer pipe section having an outer end and an inner end;

said outer end of said metal outer pipe section being secured to said water outlet assembly so as to be in fluid communication therewith;

said metal outer pipe section extending inwardly from said inner end of said water outlet assembly;

a first hollow metal coupler having an outer end and an inner end;

said outer end of said first hollow metal coupler embracing said inner end of said metal outer pipe section and being secured thereto;

an elongated tube having inner and outer ends;

said elongated tube being comprised of a cross-linked polyethylene (PEX) material having memory properties;

a first compression ring comprised of a PEX material having memory properties;

said first compression ring embracing said outer end of said elongated tube;

said outer end of said elongated tube and said first compression ring thereon being clamped onto said outer end of said first hollow metal coupler;

a second compression ring comprised of a PEX material having memory properties;

said second compression ring embracing said inner end of said elongated tube;

a second hollow metal coupler having an outer end and an inner end;

a metal inner pipe section having an outer end and an inner end;

said outer end of said metal inner pipe section being received in said outer end of said second hollow metal coupler and being secured thereto;

said outer end of said elongated tube and said second compression ring thereon receiving said inner end of said second hollow metal coupler therein and being clamped thereon;

and an elongated valve stem extending through said water outlet nozzle assembly, through said outer pipe section, through said first hollow metal coupler, through said elongated tube, through said hollow metal coupler, and into said inner pipe section.

2. The wall faucet of claim 1 wherein said outer end of said elongated tube and said first compression ring being clamped onto said outer end of said first hollow metal coupler by back shrinkage and wherein said inner end of said elongated tube and said second compression ring being clamped onto said outer end of said second hollow metal coupler by back shrinkage.

3. The wall faucet of claim 2 wherein said outer end of said elongated tube and said first compression ring were expanded prior to being positioned on said outer end of said outer end of said first hollow metal coupler and wherein said inner end of said elongated tube and said second compression ring were expanded prior to being positioned on said inner end of said second hollow metal coupler.

* * * * *